United States Patent
Hsieh

(10) Patent No.: US 7,305,126 B2
(45) Date of Patent: Dec. 4, 2007

(54) PHOTO DAZZLE COLOR TEMPERATURE CORRECTION

(75) Inventor: Wen-Hung Hsieh, Taipei Hsien (TW)

(73) Assignee: Hi-Touch Imaging Technologies Co., Ltd., Pan-Chiao, Taipei Hsien (TW)

( * ) Notice: Subject to any disclaimer, the term of this patent is extended or adjusted under 35 U.S.C. 154(b) by 577 days.

(21) Appl. No.: 10/905,695

(22) Filed: Jan. 17, 2005

(65) Prior Publication Data

US 2006/0159335 A1    Jul. 20, 2006

(51) Int. Cl.
*G06K 9/00*   (2006.01)
*G09G 5/02*   (2006.01)
*G03F 3/08*   (2006.01)

(52) U.S. Cl. .............. 382/167; 382/162; 345/604; 358/518; 358/520

(58) Field of Classification Search ........... 382/162, 382/167; 345/604; 358/518, 520
See application file for complete search history.

(56) References Cited

U.S. PATENT DOCUMENTS 4,819,061 A * 4/1989 Lang ................... 348/666
4,962,419 A * 10/1990 Hibbard et al. .......... 348/627
5,764,308 A * 6/1998 Lee ..................... 348/649
2004/0212815 A1* 10/2004 Heeman et al. .......... 358/1.9
2004/0227964 A1* 11/2004 Fujino ................. 358/1.9
2006/0120598 A1* 6/2006 Takahashi et al. ....... 382/167

FOREIGN PATENT DOCUMENTS

JP    09130815 A   *   5/1997

* cited by examiner

*Primary Examiner*—Matthew C. Bella
*Assistant Examiner*—Yubin Hung
(74) *Attorney, Agent, or Firm*—Winston Hsu

(57) ABSTRACT

A method for calculating and adjusting the color temperature of an image includes calculating an average color temperature and adjusting the chromaticity of each pixel of the image according to the average color temperature. The adjustment may be linear across all pixels or scaled according to the chromaticity of each pixel. The adjustment will not cause pixels to cross chromaticity axis boundaries, thus preserving original colors.

13 Claims, 2 Drawing Sheets

PHOTO DAZZLE COLOR TEMPERATURE CORRECTION

BACKGROUND OF INVENTION

1. Field of the Invention

The present invention relates to an image processing method, and more particularly, to a method for adjusting the color temperature of an image.

2. Description of the Prior Art

Color correction has been a standard step in photo processing for decades, and with the transition to digital imaging it has also proven necessary in image processing. Cameras do not record images according to the perception of human vision, but rather according to the physical properties of photosensitive chemicals or electronic circuits.

Accordingly, many models have been used to correct the color temperature of images. A common model is the "gray world" model, which assumes that in an image with sufficient color variety, the average color will be a uniform gray. The average color of the image, taken by summing each color component of every pixel and dividing by the number of pixels, is calculated, and all pixels are shifted by that amount to balance the image.

These models have several problems, first among them that images often do not balance out to gray. An image dominated by a red apple, a blue sky, or a green field will tend to throw non-dominant sections of the image out of balance as the color correction overcompensates. Lighting can affect the color balance of an image, as when a picture is shot under fluorescent light versus incandescent light. In some cases, the color of an object can actually be shifted to a different spectral region during correction, such as being shifted from blue to green.

An improved model for color temperature correction would be of clear benefit.

SUMMARY OF INVENTION

One objective of the present invention is to provide a method for color temperature correction which does not shift colors across the spectrum.

Another objective of the present invention is to provide a method for color temperature correction which gives a more accurate correction factor in a variety of images.

Another objective of the present invention is to provide a method for color temperature correction which prevents large regions with one predominant color from dominating the correction factor.

Accordingly, the claimed invention provides a method for modifying a color temperature of an image. The image comprises a plurality of pixel data. Each pixel datum comprises a plurality of color components. The method comprises calculating a plurality of sums, one sum for each color component of the plurality of color components, by summing each distinct value of each color component of the plurality of pixel data; calculating an average pixel datum by dividing each sum by a count of the distinct values which were summed to produce the sum; calculating a first average chromaticity value and a second average chromaticity value from the average pixel datum; calculating a first chromaticity value and a second chromaticity value from color components of each pixel datum; and updating the first chromaticity value and the second chromaticity value of each pixel datum according to the first average chromaticity value and the second average chromaticity value.

The claimed invention further provides a method for adjusting the color temperature of an image. The image comprises a plurality of pixel data. The method comprises calculating an average first chromaticity value from the plurality of pixel data; fetching a first chromaticity value of each pixel datum; and updating a first chromaticity value to a predetermined value different from a result of the first chromaticity value minus the average first chromaticity value when a sign of the first chromaticity value is different from a sign of the result of the first chromaticity value minus the average first chromaticity value.

The claimed invention further provides a method for adjusting the color temperature of an image. The image comprises a plurality of pixel data. The method comprises calculating an average first chromaticity value from the plurality of pixel data; fetching a first chromaticity value of each pixel datum; scaling the average first chromaticity value according to the first chromaticity value to generate the scaled average first chromaticity value; and updating the first chromaticity value to a result of the first chromaticity value minus the scaled average first chromaticity value.

These and other objectives of the present invention will no doubt become obvious to those of ordinary skill in the art after reading the following detailed description of the preferred embodiment that is illustrated in the various figures and drawings.

DETAILED DESCRIPTION

The method of the present invention calculates an average color temperature of an image, calculates the chromaticity of the average color temperature, and then updates the chromaticity of each pixel of the image relative to the chromaticity of the average.

A preferred embodiment takes an image represented in RGB triplets as input. To calculate an average color temperature, the method uses three arrays, for red, green, and blue respectively. Each pixel is read from the image, and its red, green, and blue color attributes are inspected. Each array, at an index determined by the value of the respective color attribute, is set to 1. When all pixels have been read, a sum and a count are generated for each color attribute. For example, for red, the red array is scanned, and at each index where the value stored in the array is 1, the index is added to the sum, and 1 is added to the count of how many indexes were added. The same is done for green and blue. Finally, each sum is divided by each respective count. The result is treated as an average color of the image.

Figure 1:
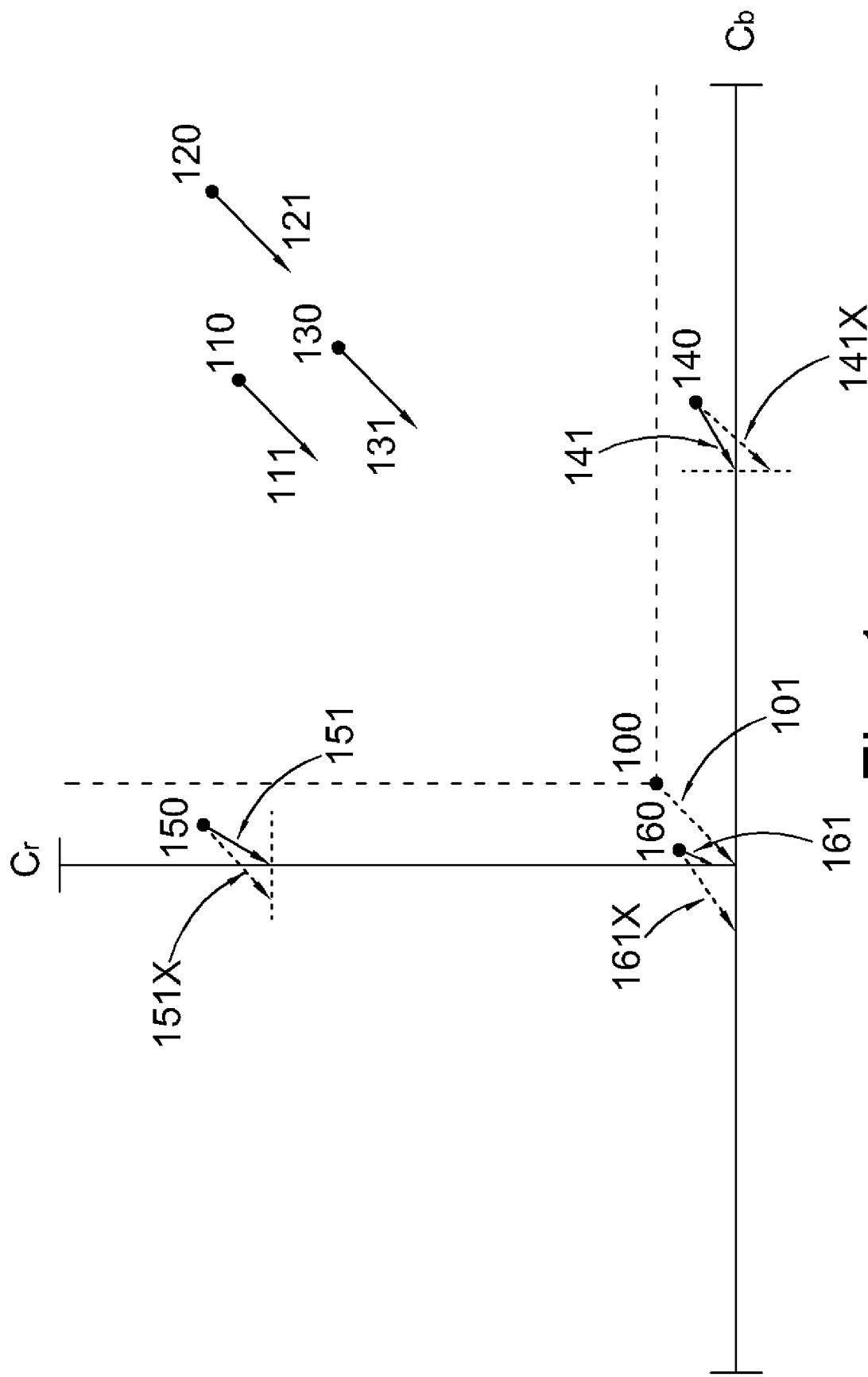
FIG. 1 is a diagram illustrating a first method for modifying a color temperature of an image according to the present invention.

Please refer to FIG. 1, which is a diagram illustrating a first method for modifying a color temperature of an image of the present invention. For example, given a very simple image with six pixels as follows:

{{{150, 10, 100}, {150, 50, 100}},
{{125, 10, 100}, {10, 10, 100}},
{{125, 6, 6}, {15, 6, 6}}} the pixels of this image are:
{150, 10, 100}
{150, 50, 100}

{125, 10, 100}
{10, 10, 100}
{125, 6, 6}
{15, 6, 6} corresponding respectively to point 110, point 120, point 130, point 140, point 150, and point 160 in the YCbCr chromaticity space in FIG. 1. Please note that FIG. 1 does not show the image itself, but rather represents a chromaticity diagram with the Cb and Cr attributes and the various pixels' chromaticities thereon.

The red array would have values of 1 at indexes 150, 125, 15, and 10.

The green array would have values of 1 at 6, 10, and 50.

The blue array would have values of 1 at 6 and 100.

This would generate sums of 300, 66, and 106, and counts of 4, 3, and 2 respectively for red, green, and blue.

The average color temperature would be calculated as 75 for red, 22 for green, and 53 for blue, or {71, 56, 24}.

Thus, each unique color attribute value is summed and counted, and the sum is divided by the count to produce an average.

Next, this average is transformed into coordinates in the YCbCr chromaticity space, and the Cb and Cr attributes are taken. These chromaticity coordinates correspond to point 100 in FIG. 1.

The final step is to shift the image's overall color temperature by subtracting the average chromaticity, as calculated above, from each pixel's chromaticity. In FIG. 1, this is represented by the vectors 111, 121, 131, 141X, 151X, and 161X extending from each point 110, 120, 130, 140, 150, and 160 respectively. However, since crossing an axis is undesirable, as would happen in the case of point 140 (shown by vector 141X), point 150 (shown by vector 151X), and point 160 (shown by vector 161X), the signs of the original chromaticity Cb and Cr coordinates are tested against the signs of the resultant chromaticity Cb and Cr coordinates, and if a sign differs on either the Cb or Cr component from its original, that component is set to zero. Thus the chromaticities of point 140 and point 150 are moved to the axis rather than beyond, preventing a color shift, as shown by vectors 141 and 151 respectively. Likewise, the chromaticity of point 160 is moved to the origin rather than beyond, as shown by vector 161, again preventing a color shift.

Figure 2:
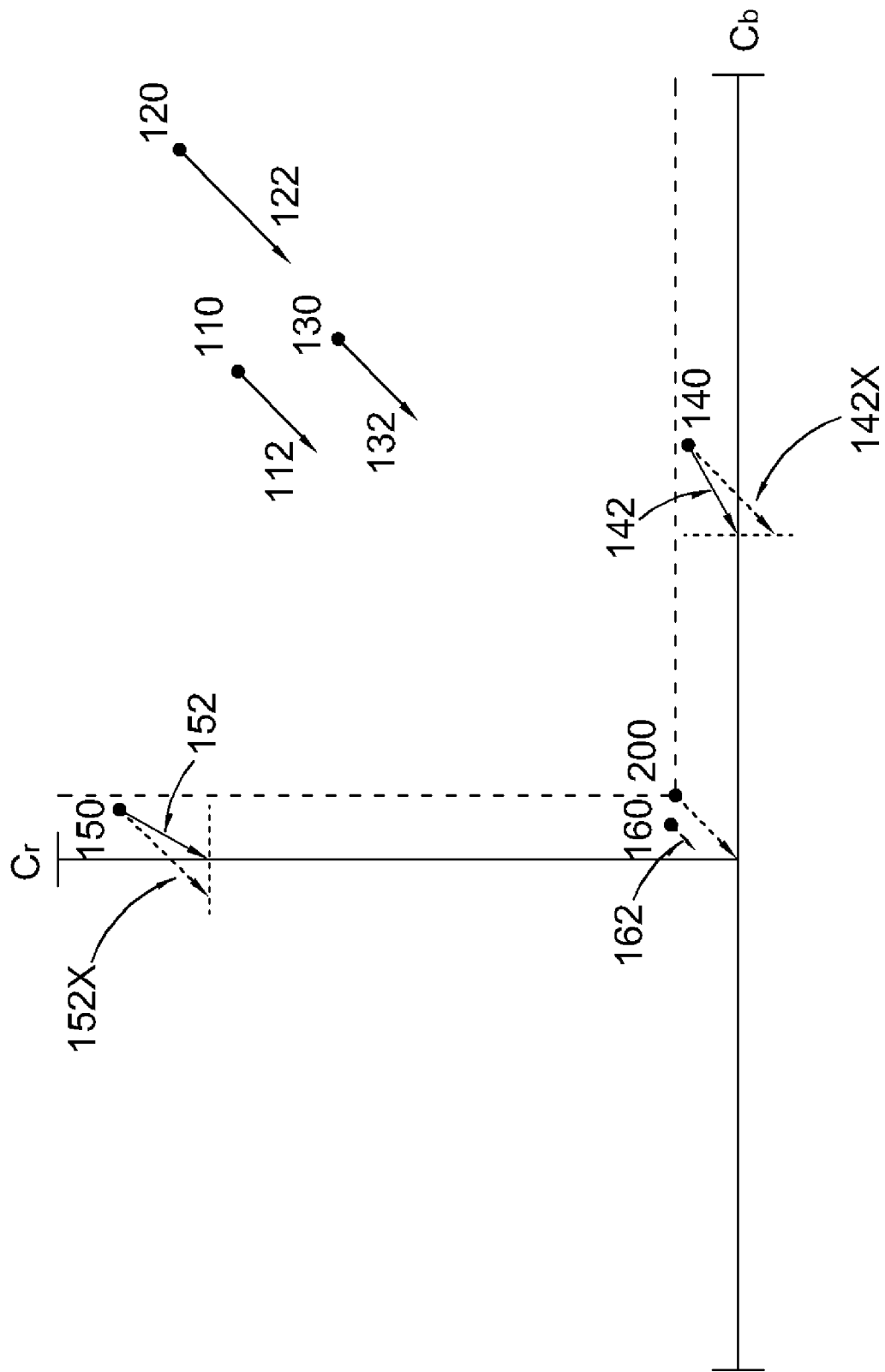
FIG. 2 is a diagram illustrating a second method for modifying a color temperature of an image according to the present invention.

The present invention is not restricted to transforming all pixels in the identical manner, however. Please refer to FIG. 2, which is a diagram illustrating a second method for modifying a color temperature of the image of the present invention. FIG. 2 shows the vectors by which the chromaticities of the pixels are changed being relative to the distance from the origin of the chromaticity coordinates. One possible formula is to multiply the average chromaticity by a scaling factor relative to the pixel's chromaticity, and to subtract the result from the pixel's chromaticity. For example, if the maximum values of Cb and Cr are 255 and 255 respectively, and the pixel's Cb and Cr coordinates are 85 and 51 respectively, the average chromaticity's Cb and Cr coordinates can be multiplied by ⅓ and ⅕ respectively. Alternately, the length of a vector from the pixel's Cb—Cr coordinate to the origin can be calculated, and the result divided by the maximum vector's length to create a ratio, and the average chromaticity's Cb and Cr coordinates can be multiplied by this ratio. The resultant chromaticity Cb and Cr coordinates are again tested against the signs of the original chromaticity Cb and Cr coordinates to determine whether one or both axes were crossed, and to set the respective coordinate(s) to zero if so. Thus, point 120 is adjusted relatively more (shown by vector 122) than points 110 (shown by vector 112) and 130 (shown by vector 132), while point 140's adjustment is relatively less (shown by vector 142X, and limited to vector 142 due to the axis-crossing restriction). Likewise, point 150's vector 152X is restricted by the axis so that point 150 is actually adjusted by vector 152. Point 160, having lower unadjusted chromaticities, generates such a short vector that its adjustment will not cross a boundary, and so it is adjusted according to the vector 162.

It should be noted that many possible scaling methods can be used in conjunction with the average chromaticity, either as separate coordinates or combined, to adjust the image's chromaticity for various effects, and that the present invention should not be construed as limited to the above-mentioned scaling methods.

The present invention thus provides an improved method for adjusting the color temperature of an image. The improved method allows for linear or scaled adjustments of pixels' chromaticities according to the magnitude of their chromaticity, will not cross axes of the chromaticity chart thereby preserving colors, and provides an improved estimate of the color temperature of a variety of images.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for modifying a color temperature of an image, the image comprising a plurality of pixel data, each pixel datum comprising a plurality of color components, the method comprising following steps:
   (a) calculating a plurality of sums, one sum for each color component of the plurality of color components, by summing each distinct value of each color component of the plurality of pixel data;
   (b) calculating an average pixel datum by dividing each sum by a count of the distinct values which were summed to produce the sum;
   (c) calculating a first average chromaticity value and a second average chromaticity value from the average pixel datum;
   (d) calculating a first chromaticity value and a second chromaticity value from color components of each pixel datum; and
   (e) updating the first chromaticity value and the second chromaticity value of each pixel datum according to the first average chromaticity value and the second average chromaticity value.

2. The method of claim 1 wherein the plurality of color components are red, green, and blue.

3. The method of claim 1 wherein step (a) comprises:
   allocating a plurality of memory units;
   fetching a color component of each pixel datum of the plurality of pixel data;
   setting a selected memory unit indexed by a value of the color component to a predetermined value;
   inspecting the plurality of memory units in sequence; and
   adding values of color components whose corresponding memory units contain the predetermined value to generate the sum.

4. The method of claim 3 wherein step (b) comprises:
   counting number of memory units which contain the predetermined value to generate the count.

5. The method of claim 1 further comprising scaling the average first and second chromaticity values according to the first and second chromaticity values to generate the scaled average first and second chromaticity values respectively; wherein step (e) comprises updating the first and second chromaticity values to a result of the first chromaticity value minus the scaled average first chromaticity value and a result of the second chromaticity value minus the scaled average second chromaticity value respectively if signs of the first and second chromaticity values are consistent with signs of the results of the first and second chromaticity values minus the scaled average first and second chromaticity values respectively or updating the first and second chromaticity values to predetermined values different from the results of the first and second chromaticity values minus the scaled average first and second chromaticity values respectively when the signs of the first and second chromaticity values are different from the signs of the results of the first and second chromaticity values minus the scaled average first and second chromaticity values respectively.

6. A method for adjusting the color temperature of an image, the image comprising a plurality of pixel data, the method comprising:
   calculating an average first chromaticity value from the plurality of pixel data;
   fetching a first chromaticity value of each pixel datum; and
   updating a first chromaticity value to a predetermined value different from a result of the first chromaticity value minus the average first chromaticity value when a sign of the first chromaticity value is different from a sign of the result of the first chromaticity value minus the average first chromaticity value.

7. The method of claim 6 further comprising updating a first chromaticity value to a result of the first chromaticity value minus the average first chromaticity value when a sign of the first chromaticity value is not different from a sign of the result of the first chromaticity value minus the average first chromaticity value.

8. The method of claim 6 further comprising:
   calculating an average second chromaticity value from the plurality of pixel data;
   fetching a second chromaticity value of each pixel datum; and
   updating a second chromaticity value to a predetermined value different from a result of the second chromaticity value minus the average second chromaticity value when a sign of the second chromaticity value is different from a sign of the result of the second chromaticity value minus the average second chromaticity value.

9. The method of claim 8 further comprising updating a second chromaticity value to a result of the second chromaticity value minus the average second chromaticity value when a sign of the second chromaticity value is not different from a sign of the result of the second chromaticity value minus the average second chromaticity value.

10. A method for adjusting the color temperature of an image, the image comprising a plurality of pixel data, the method comprising following steps:
   (a) calculating an average first chromaticity value from the plurality of pixel data;
   (b) fetching a first chromaticity value of each pixel datum;
   (c) scaling the average first chromaticity value according to the first chromaticity value to generate the scaled average first chromaticity value; and
   (d) updating the first chromaticity value to a result of the first chromaticity value minus the scaled average first chromaticity value.

11. The method of claim 10 wherein step (d) is performed when a sign of the first chromaticity value is consistent with a sign of a result of the first chromaticity value minus the scaled average first chromaticity value, the method further comprising updating a first chromaticity value to a predetermined value different from a result of the first chromaticity value minus the scaled average first chromaticity value when a sign of the first chromaticity value is different from a sign of the result of the first chromaticity value minus the scaled average first chromaticity value.

12. The method of claim 10 further comprising following steps:
   (e) calculating an average second chromaticity value from the plurality of pixel data;
   (f) fetching a second chromaticity value of each pixel datum;
   (g) scaling the average second chromaticity value according to the second chromaticity value to generate the scaled average second chromaticity value; and
   (h) updating the second chromaticity value to a result of the second chromaticity value minus the scaled average second chromaticity value.

13. The method of claim 12 wherein step (h) is performed when a sign of the second chromaticity value is consistent with a sign of a result of the second chromaticity value minus the scaled average second chromaticity value, the method further comprising updating a second chromaticity value to a predetermined value different from a result of the second chromaticity value minus the scaled average second chromaticity value when a sign of the second chromaticity value is different from a sign of the result of the second chromaticity value minus the scaled average second chromaticity value.

* * * * *